(12) United States Patent
Retsina et al.

(10) Patent No.: US 9,738,729 B2
(45) Date of Patent: Aug. 22, 2017

(54) PROCESSES AND APPARATUS FOR REMOVAL OF FERMENTATION INHIBITORS FROM BIOMASS HYDROLYSATES

(71) Applicant: API Intellectual Property Holdings, LLC, Atlanta, GA (US)

(72) Inventors: Theodora Retsina, Atlanta, GA (US); Jean-Pierre Monclin, Atlanta, GA (US); Ryan Zebroski, Fayetteville, GA (US); Anastasios Trypakis, Metamorfosi (GR); Vesa Pylkkanen, Atlanta, GA (US)

(73) Assignee: API Intellectual Property Holdings, LLC, Atlanta, GA (US)

(*) Notice: Subject to any disclaimer, the term of this patent is extended or adjusted under 35 U.S.C. 154(b) by 373 days.

(21) Appl. No.: 14/623,853

(22) Filed: Feb. 17, 2015

(65) Prior Publication Data
US 2015/0232580 A1 Aug. 20, 2015

Related U.S. Application Data

(60) Provisional application No. 61/941,873, filed on Feb. 19, 2014.

(51) Int. Cl.
*C08B 15/00* (2006.01)
*C08H 8/00* (2010.01)

(52) U.S. Cl.
CPC .............. *C08B 15/00* (2013.01); *C08H 8/00* (2013.01)

(58) Field of Classification Search
CPC ............................... C08B 15/00; B01D 19/00
USPC ..................................................... 95/263, 264
See application file for complete search history.

(56) References Cited

U.S. PATENT DOCUMENTS 4,342,831 A * 8/1982 Faber ........................ C12P 7/10
127/37

\* cited by examiner

*Primary Examiner* — Robert A Hopkins
(74) *Attorney, Agent, or Firm* — O'Connor & Company; Ryan P. O'Connor

(57) ABSTRACT

The disclosure provides a process for separating fermentation inhibitors from a biomass-derived hydrolysate, comprising: introducing a biomass-derived liquid hydrolysate stream to a stripping column; introducing a steam-rich vapor stream to the stripping column to strip fermentation inhibitors (such as acetic acid) from the liquid hydrolysate stream; recovering a stripped liquid stream and a stripper vapor output stream; compressing the stripper vapor output stream; introducing the compressed vapor stream, and a water-rich liquid stream, to an evaporator; recovering, from the evaporator, an evaporated liquid stream and an evaporator output vapor stream; and recycling the evaporator output vapor stream to the stripping column as the steam-rich vapor stream. Other variations utilize a rectification column to recover a rectified liquid stream and a rectification column vapor stream, and recycle the rectification column vapor stream to the stripping column as the steam-rich vapor stream.

40 Claims, 4 Drawing Sheets

PROCESSES AND APPARATUS FOR REMOVAL OF FERMENTATION INHIBITORS FROM BIOMASS HYDROLYSATES

PRIORITY DATA

This patent application is a non-provisional application claiming priority to U.S. Provisional Patent App. No. 61/941,873, filed Feb. 19, 2014, which is hereby incorporated by reference herein.

FIELD OF THE INVENTION

The present invention generally relates to processes for separating acetic acid and other fermentation inhibitors from biomass-derived hydrolysates.

BACKGROUND OF THE INVENTION

Producing ethanol and other fermentation products from biomass has proven to be challenging on multiple fronts. Biomass is inherently recalcitrant to enzymatic and microbial attack, which necessitates a pretreatment to make the crystalline cellulose in the lignocellulosic substrate more available for enzymatic hydrolysis. To complicate the matter further, biomass intrinsically contains microbial inhibitors that are released during pretreatment and enzymatic hydrolysis, affecting fermentation performance. Inhibition can be a function of disruption of cellular replication, disruption of sugar metabolism, or disruption of membrane integrity. There are several classes of fermentation inhibitors encountered in biomass conversion: furfural and hydroxymethyl furfural (furans), phenolic compounds, and weak acids.

When pretreatment conditions are too severe, furfural and 5-HMF are produced from pentose and hexose sugars, respectively. They can be metabolized by yeast to their furfuryl alcohol forms. At low concentrations, furfural can be beneficial to fermentation since yeast can use it to regenerate NAD+, thus reducing glycerol production. However, cell replication is inhibited by furfural and 5-HMF at higher concentrations, inducing an increased lag phase in growth as well as halting anaerobic growth. Ethanol production is also negatively affected at high concentrations. These inhibitors can be avoided to a large extent by optimizing pretreatment conditions for each feedstock.

Weak acids such as acetic acid originate from the de-acetylation of hemicellulose in the biomass or from sugar and lignin degradation during pretreatment (e.g., levulinic acid and formic acid). At fermentation pH (e.g., 5.5), these acids are relatively near their pKa, existing equally in their associated and dissociated states. There are multiple theories as to how these acids inhibit fermentation, such as uncoupling of metabolism or intracellular anionic accumulation. They result in a significant drop in intracellular pH and an inability to produce enough ATP for the organism to survive. Also, since undissociated weak acids can pass through the cell membrane and dissociate in the cytosol, the acid can then interfere with the enzymes used for sugar metabolism. It is inherently difficult to prevent the formation of weak acids—especially acetic acid—since they are intrinsic to the biomass feedstock.

Acetic acid is a known inhibitor of microorganism activity during fermentation. The general practice is to dilute the fermenter/propagator feed stream in order to reduce the concentration of acetic acid below a certain level which allows an acceptable level of microorganism activity. However by doing so, sugars are also diluted and consequently the product concentration is dilute.

Phenolic compounds, like vanillin, syringaldehyde, and ferulate, are a major constituent of lignin and are also linked to hemicellulose in some biomass substrates. These compounds are able to embed themselves into the cell membrane of organisms, causing a loss of integrity. Lower-molecular-weight phenolic acids behave in the same way as weak acids with respect to disruption of intracellular pH.

Because fermentation inhibitors are inevitably produced and present in biomass hydrolysates, what is needed is a practical approach to removing fermentation inhibitors prior to fermentation of sugars derived from any type of biomass (e.g., wood, bagasse, straw, etc.).

SUMMARY OF THE INVENTION

The present invention addresses the aforementioned needs in the art.

In some variations, the invention provides a process for separating fermentation inhibitors from a biomass-derived hydrolysate, the process comprising:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) compressing the stripper vapor output stream to generate a compressed vapor stream;

(f) introducing the compressed vapor stream, and a water-rich liquid stream, to an evaporator;

(g) recovering, from the evaporator, an evaporated liquid stream and an evaporator output vapor stream; and (h) recycling at least a portion of the evaporator output vapor stream to the stripping column as the steam-rich vapor stream, or a portion thereof.

In some embodiments, the fermentation inhibitor is selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof.

In certain embodiments, the fermentation inhibitor is acetic acid. The stripped liquid stream preferably has less than 10 g/L acetic acid concentration, such as less than 5 g/L acetic acid concentration.

In some embodiments, the water-rich liquid stream contains biomass solids that are concentrated in the evaporator. These biomass solids may be derived from the same biomass feedstock as is the biomass-derived liquid hydrolysate, in an integrated process.

Optionally, the fermentation inhibitor is recycled to a previous unit operation (e.g., digestor or reactor) for generating the biomass-derived liquid hydrolysate stream, to assist with hydrolysis or pretreatment of a biomass feedstock or component thereof. For example, acetic acid may be recycled for this purpose, to aid in removal of hemicelluloses from biomass and/or in oligomer hydrolysis to monomer sugars.

Some variations provide a process for separating fermentation inhibitors from a biomass-derived hydrolysate, the process comprising:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) introducing the stripper vapor output stream, and a water-rich liquid stream, to an evaporator;

(f) recovering, from the evaporator, an evaporated liquid stream and an evaporator output vapor stream;

(g) compressing the evaporator output vapor stream to generate a compressed vapor stream; and (h) recycling at least a portion of the compressed vapor stream to the stripping column as the steam-rich vapor stream, or a portion thereof.

In some embodiments, the evaporator is a boiler, the water-rich liquid stream comprises boiler feed water, and the evaporated liquid stream comprises boiler condensate.

The process may be continuous, semi-continuous, or batch. When continuous or semi-continuous, the stripping column may be operated countercurrently, cocurrently, or a combination thereof.

In certain variations of the present invention, a process for separating and recovering a fermentation inhibitor from a biomass-derived hydrolysate comprises:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) introducing the stripper vapor output stream, and a water-rich liquid stream, to a rectification column;

(f) recovering, from the rectification column, a rectified liquid stream and a rectification column vapor stream, wherein the rectified liquid stream has higher fermentation inhibitor concentration than the liquid hydrolysate stream; and (g) recycling at least a portion of the rectification column vapor stream to the stripping column as the steam-rich vapor stream, or a portion thereof.

The fermentation inhibitor may be selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof. In some embodiments, the fermentation inhibitor comprises or consists essentially of acetic acid.

In the case of acetic acid, the stripped liquid stream preferably has less than 10 g/L acetic acid concentration, such as less than 5 g/L acetic acid concentration. The rectification column vapor stream preferably has less than 0.5 g/L acetic acid concentration, such as less than 0.1 g/L acetic acid concentration. The rectified liquid stream preferably has at least 25 g/L acetic acid concentration, such as about 40 g/L or more acetic acid. In some embodiments, the rectified liquid stream has at least 10 times higher concentration of acetic acid compared to the stripped liquid stream. In certain embodiments, the process further comprises recovering the acetic acid contained in the rectified liquid stream using liquid-vapor extraction or liquid-liquid extraction.

In some embodiments, the water-rich liquid stream includes evaporator condensate. The evaporator condensate may be derived from an evaporator in which biomass solids are concentrated, and the biomass solids may be derived from the same biomass feedstock as the biomass-derived liquid hydrolysate, in an integrated process.

Optionally, the fermentation inhibitor (e.g., acetic acid) is recycled to a previous unit operation for generating the biomass-derived liquid hydrolysate stream, to assist with hydrolysis or pretreatment of a biomass feedstock or component thereof.

The process may be continuous, semi-continuous, or batch. When continuous or semi-continuous, the stripping column may be operated countercurrently, cocurrently, or a combination thereof. The rectification column may be operated continuous, semi-continuous, or batch.

In various embodiments, step (g) comprises compressing and/or conveying the rectification column vapor stream using a device selected from the group consisting of a mechanical centrifugal vapor compressor, a mechanical axial vapor compressor, a thermocompressor, an ejector, a diffusion pump, a turbomolecular pump, and combinations thereof.

If desired, a base or other additive may be included in the water-rich liquid stream, or separately introduced to the rectification column, to produce salts or other reaction products derived from fermentation inhibitors. In some embodiments, the water-rich liquid stream includes one or more additives capable of reacting with the fermentation inhibitor. In certain embodiments, the fermentation inhibitor includes acetic acid, and the one or more additives include a base. An acetate salt may then be generated within the rectification column, or in a unit coupled to the rectification column. Optionally, the acetate salt may be separated and recovered using liquid-vapor extraction or liquid-liquid extraction.

DETAILED DESCRIPTION OF EMBODIMENTS OF THE INVENTION

Figure 1:
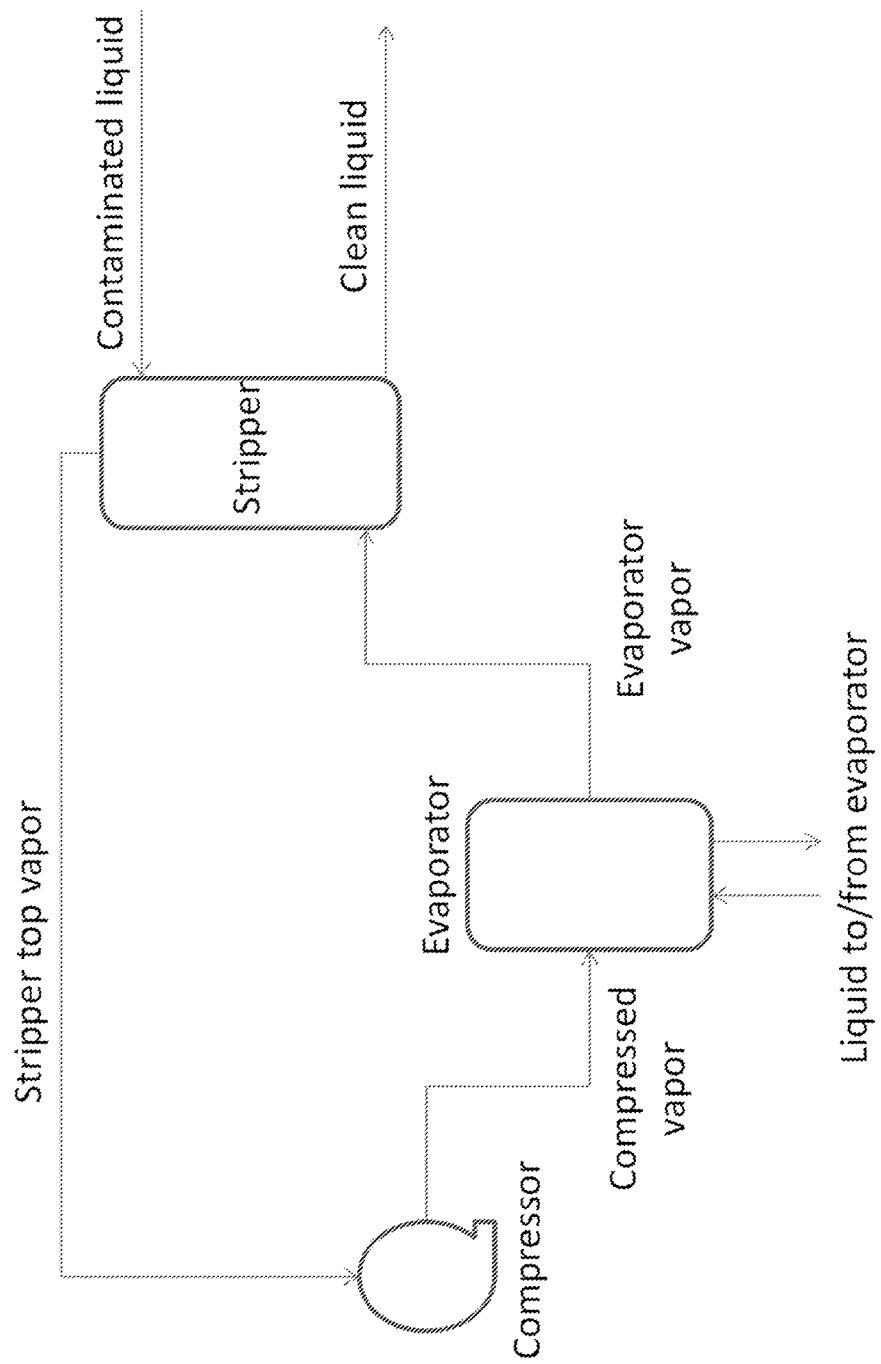
FIG. 1 is a simplified block-flow diagram depicting the process of some embodiments of the present invention, using an evaporator and stripping column.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of excludes" any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present disclosure provides processes, apparatus, and systems capable of removing acetic acid, formic acid, uronic acid, HMF, furfural, and other compounds (including but not limited to fermentation inhibitors) from biomass hydrolysate streams. While some of the disclosure herein is directed to acetic acid, it will be understood that the invention is not limited to the example of acetic acid as the fermentation inhibitor to be removed.

Fermentation inhibitors may be removed by steam entrainment, steam stripping, flash evaporation with steam, or some combination thereof. In some embodiments, the removal of acetic acid from the hydrolysate is made by steam entrainment in a vertical column with internal trays. Vapor from a mechanical-vapor recompression (MVR) unit may be utilized as the source of steam. The process flow thus may combine an acetic acid stripper with vapor-recompression evaporation. It is believed that in some embodiments, separation of acetic acid from a liquid stream can be accomplished using the minimum possible amount of energy, thermodynamically.

In some embodiments, by removing acetic acid to a level below 5 grams per liter, activity of the microorganisms is kept at a high level allowing one to avoid dilution of the sugar. Higher ethanol concentration in the beer are thus obtained from fermenters. Of course, the concept may be applied to fermentations other than ethanol production.

This concept may be applied for acetic acid removal from aqueous solutions produced from agricultural waste biomass with acid hydrolysis, but it can be applied to other cases, too. Acetic acid boiling point is very close to water boiling point, so it is very hard to separate water from acetic acid and a significant amount of energy is required, which may result in poor process economics. On the other hand, biomass hydrolysis processes typically require significant evaporation of water prior to hydrolysis, which may be done with a vapor compressor evaporator (VCE).

To reduce dramatically the energy usage, a VCE or MCR unit may be configured to produce vapor in the acetic acid stripper and then the recompression of the stripper outlet vapor allows reuse back in the VCE. The actual vapor (energy) flow may be: Vapor from VCE evaporator boiling side→Acetic acid stripper→Vapor compressor→VCE evaporator condensing side. The stripper and the vapor compressor may switch positions (e.g., FIG. 1 and FIG. 2), depending on what is better for the specific process.

The stripper may be designed in such a way in order to have very small pressure drop on the vapor side. For example, the stripper diameter may be large compared to a conventional acetic acid stripper, and/or the vapor may enter at the vapor side of the first tray which replaces the stripper reboiler.

If the percentage of the substance that has to be removed is relatively low, less trays are required compared to a conventional stripper. The reason is that the amount of vapor passing through the stripper is much higher than in the case of a conventional stripper.

In some embodiments, it is not necessary to completely remove a substance from the stripped liquor, but only a portion of it, so the usage of dirty steam from a VCE evaporator is adequate. Using this approach, the acetic acid concentration may be reduced down to less than 15, 14, 13, 12, 11, 10, 9, 8, 7, 6, 5, 4, 3, 2, 1 g/L, or less.

Some embodiments employ a pre-flash unit configured to remove acetic acid in a concentrated stream. Also non-condensables may be removed, so they do not make their way to the evaporator in subsequent steps. This may be a standard pre-flash vessel. The vapor from the pre-flash may be condensed and collected. From the bottom of the pre-flash vessel, material is conveyed to a steam stripping column. The acetic-laden steam discharges from the top of the column, and returns to the suction line of the MVR, in certain embodiments.

Preferably, the steam (or a majority thereof) is returned to the evaporator as vapor (i.e., not condensed) after utilizing it to strip the acetic acid from the hydrolysate.

The resulting integration in the overall process provides several benefits. It has been realized/discovered that water vapor that already exists in the process—for example, water vapor resulting from the evaporation of post-digestor wash water—is suitable to perform the removal of the fermentation inhibitors. Because this stream already exists in the process, and because it will not condense in the stripper, it comes at little cost (slightly increased compressor electricity).

Certain exemplary embodiments of the invention will now be described. These embodiments are not intended to limit the scope of the invention as claimed. The order of steps may be varied, some steps may be omitted, and/or other steps may be added. Reference herein to first step, second step, etc. is for illustration purposes only.

Figure 2:
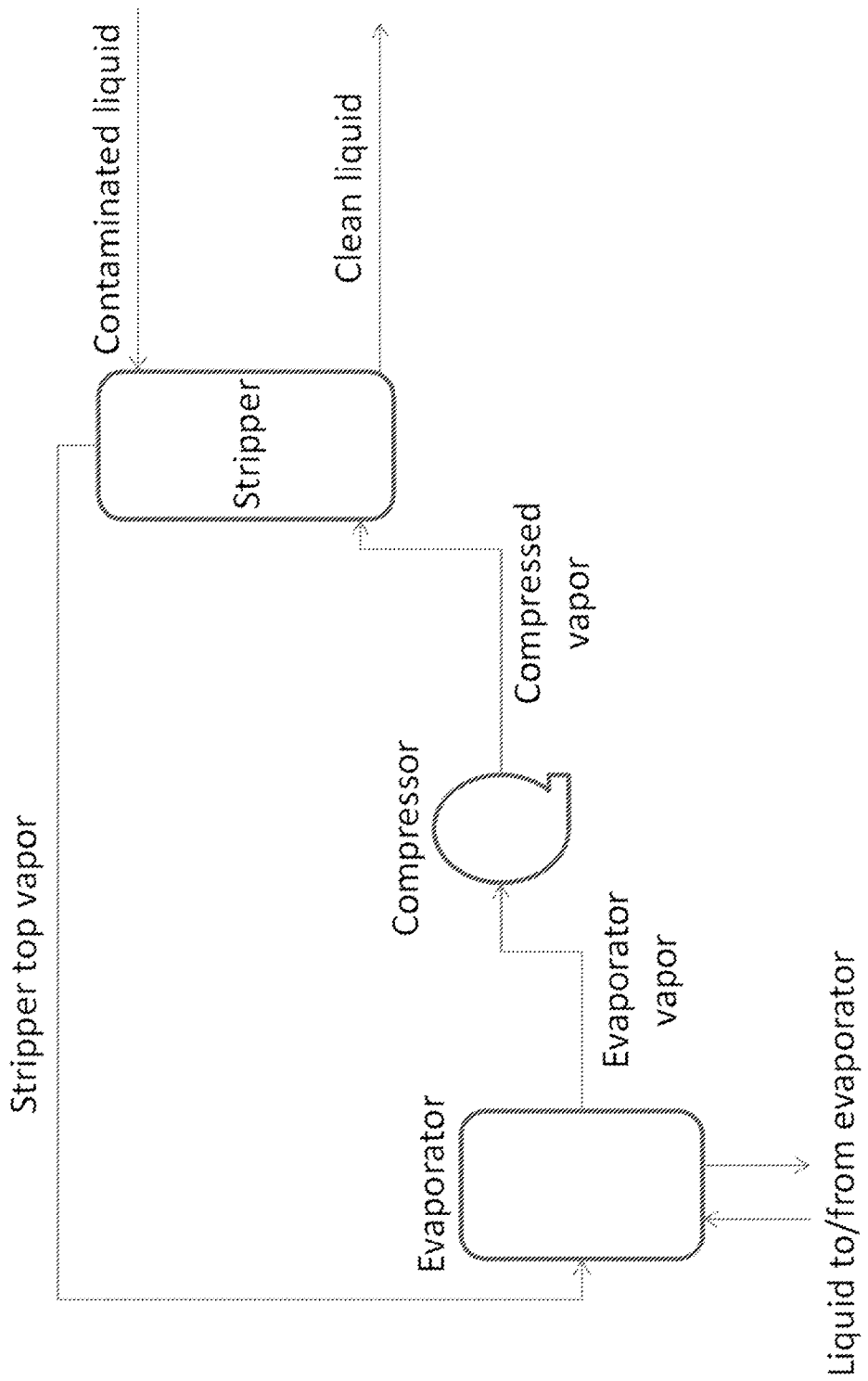
FIG. 2 is a simplified block-flow diagram depicting the process of some embodiments, using an evaporator and stripping column.

FIGS. 1 and 2 depict certain process configurations that may be utilized. Both configurations utilize steam or a steam-rich vapor (evaporator vapor) to strip fermentation inhibitors from contaminated liquid (e.g., biomass hydrolysate), with the stripper top vapor returning to the evaporator. The stripper top vapor may be compressed, or may be directly fed to the evaporator with the evaporator vapor then being compressed and fed to the stripper for additional stripping. The difference between FIG. 1 and FIG. 2 is the order of the compressor and evaporator. In principle, compressors could be placed both before and after the evaporator, i.e. both to compress stripper top vapor and to compress evaporator vapor.

Figure 3:
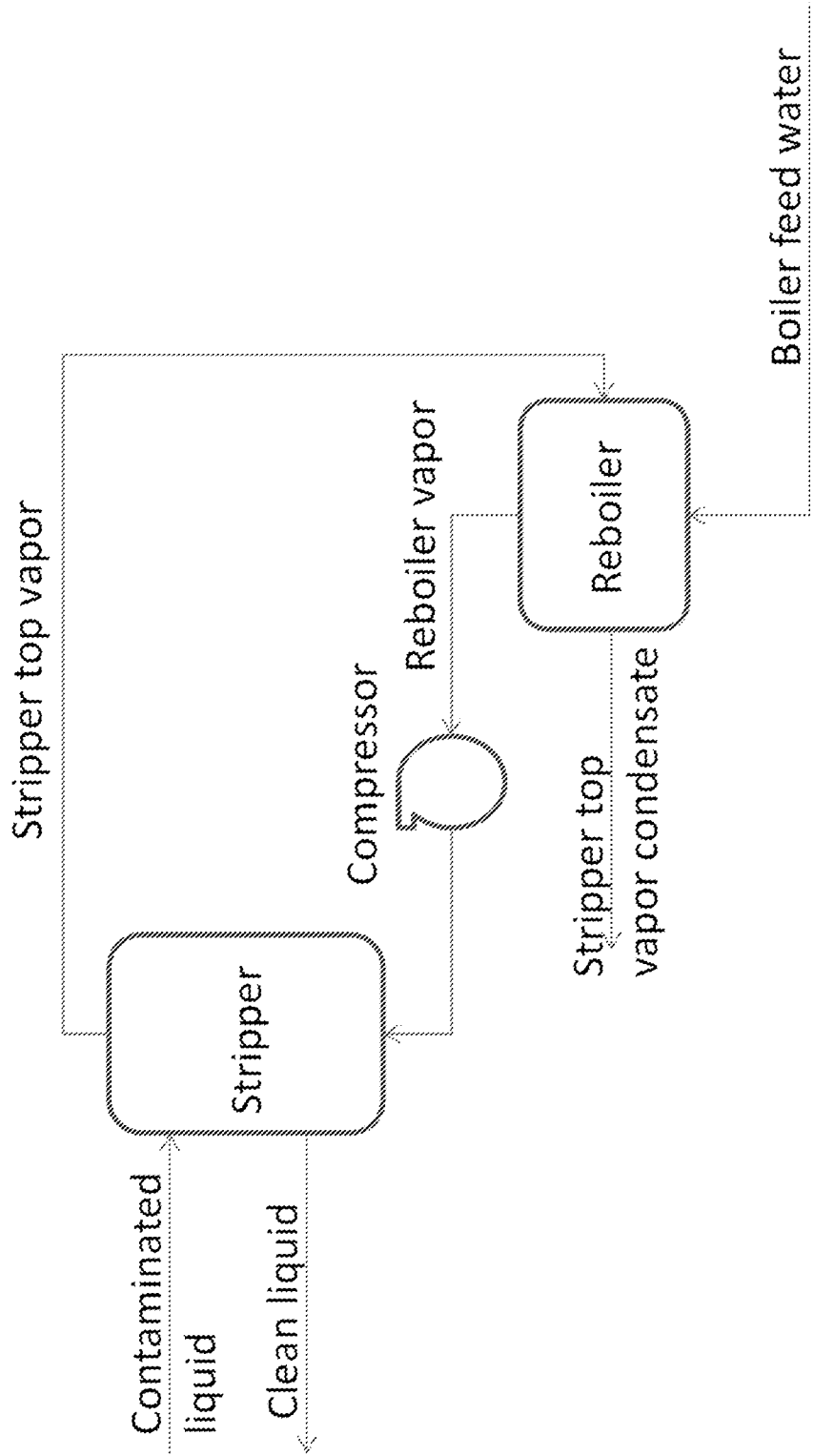
FIG. 3 is a simplified block-flow diagram depicting the process of certain embodiments, using a stripping column and reboiler.

FIG. 3 depicts a configuration similar to FIG. 2, except that the evaporator is replaced with a reboiler. The reboiler and compressor together form a vapor compressor evaporator. In the simple configuration, the stripper and vapor compressor evaporator are independent units and can operate separately. The size of each unit is independent from the size of the other unit. The stripper bottom vapor is clean steam and may more efficiently clean the contaminated liquid. The VCE compressor size may be reduced.

Figure 4:
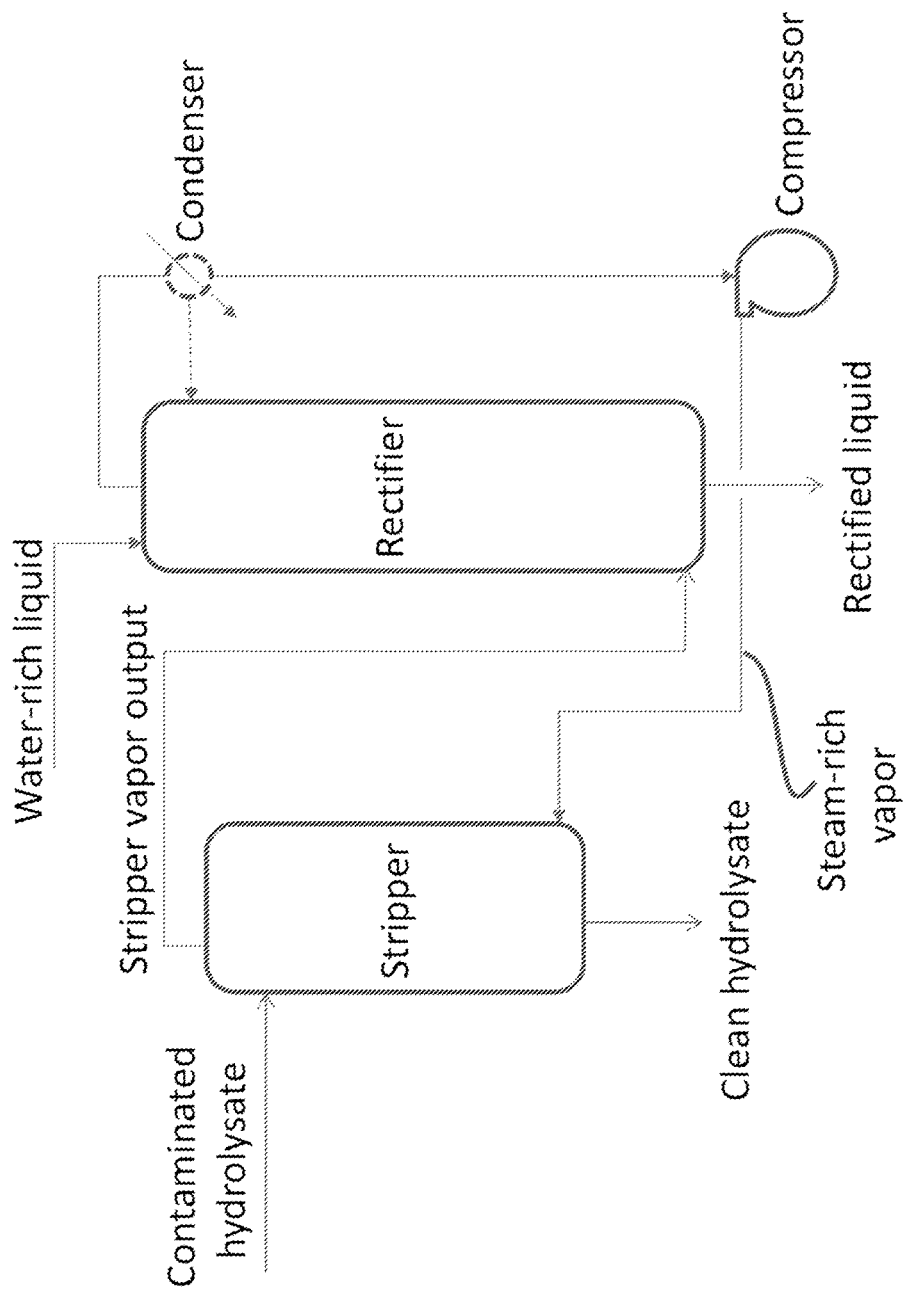
FIG. 4 is a simplified block-flow diagram depicting the process of some embodiments of the present invention, using a stripping column and rectifying column.

FIG. 4 is a simplified block-flow diagram depicting the process of some embodiments of the present invention, using a stripping column and rectifying column. In FIG. 4, the stripper vapor output is fed to a rectifier (rectification column) at or near the bottom. Water or a liquid rich in water is fed at or near the top. The resulting rectified liquid is rich in acetic acid and/or other fermentation inhibitors. The rectifier overhead is optionally passed through a partial condenser, with liquid returning to the column as reflux, and vapor then being compressed as steam-rich vapor for feeding to the stripping column.

In some variations, the invention provides a process for separating fermentation inhibitors from a biomass-derived hydrolysate, the process comprising:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) compressing the stripper vapor output stream to generate a compressed vapor stream;

(f) introducing the compressed vapor stream, and a water-rich liquid stream, to an evaporator;

(g) recovering, from the evaporator, an evaporated liquid stream and an evaporator output vapor stream; and (h) recycling at least a portion of the evaporator output vapor stream to the stripping column as the steam-rich vapor stream, or a portion thereof.

In some embodiments, the fermentation inhibitor is selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof.

In certain embodiments, the fermentation inhibitor is acetic acid. The stripped liquid stream preferably has less than 10 g/L acetic acid concentration, such as less than 9, 8, 7, 6, 5, 4, 3, 2, or 1 g/L acetic acid concentration.

Fermentation inhibitors may include furfural, 5-HMF, and phenolic compounds. Phenolic compounds include lignin and lignin derivatives, sugar-derived tars/char (e.g. furfural decomposition products), phenols, polyphenols, p-coumaryl alcohol, coniferyl alcohol, sinapyl alcohol, syringaldehyde, coumaric acid, catechol, etc.

Fermentation inhibitors may also include sulfur-containing compounds, such as sulfuric acid, sulfurous acid, sulfur dioxide, lignosulfonic acid, and combinations or derivatives thereof.

In some embodiments, the water-rich liquid stream contains biomass solids that are concentrated in the evaporator. These biomass solids may be derived from the same biomass feedstock as is the biomass-derived liquid hydrolysate, in an integrated process.

Optionally, the fermentation inhibitor is recycled to a previous unit operation (e.g., digestor or reactor) for generating the biomass-derived liquid hydrolysate stream, to assist with hydrolysis or pretreatment of a biomass feedstock or component thereof. For example, acetic acid may be recycled for this purpose, to aid in removal of hemicelluloses from biomass and/or in oligomer hydrolysis to monomer sugars.

Some variations provide a process for separating fermentation inhibitors from a biomass-derived hydrolysate, the process comprising:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) introducing the stripper vapor output stream, and a water-rich liquid stream, to an evaporator;

(f) recovering, from the evaporator, an evaporated liquid stream and an evaporator output vapor stream;

(g) compressing the evaporator output vapor stream to generate a compressed vapor stream; and (h) recycling at least a portion of the compressed vapor stream to the stripping column as the steam-rich vapor stream, or a portion thereof.

In some embodiments, the evaporator is a boiler, the water-rich liquid stream comprises boiler feed water, and the evaporated liquid stream comprises boiler condensate.

The process may be continuous, semi-continuous, or batch. When continuous or semi-continuous, the stripping column may be operated countercurrently, cocurrently, or a combination thereof.

In certain variations of the present invention, a process for separating and recovering a fermentation inhibitor from a biomass-derived hydrolysate comprises:

(a) providing a biomass-derived liquid hydrolysate stream comprising a fermentation inhibitor;

(b) introducing the liquid hydrolysate stream to a stripping column;

(c) introducing a steam-rich vapor stream to the stripping column to strip at least a portion of the fermentation inhibitor from the liquid hydrolysate stream;

(d) recovering, from the stripping column, a stripped liquid stream and a stripper vapor output stream, wherein the stripped liquid stream has lower fermentation inhibitor concentration than the liquid hydrolysate stream;

(e) introducing the stripper vapor output stream, and a water-rich liquid stream, to a rectification column;

(f) recovering, from the rectification column, a rectified liquid stream and a rectification column vapor stream, wherein the rectified liquid stream has higher fermentation inhibitor concentration than the liquid hydrolysate stream; and (g) recycling at least a portion of the rectification column vapor stream to the stripping column as the steam-rich vapor stream, or a portion thereof.

The fermentation inhibitor may be selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof. In some embodiments, the fermentation inhibitor comprises or consists essentially of acetic acid.

In the case of acetic acid, the stripped liquid stream preferably has less than 10 g/L acetic acid concentration, such as less than 9, 8, 7, 6, 5, 4, 3, 2, or 1 g/L acetic acid concentration. The rectification column vapor stream preferably has less than 1 g/L acetic acid concentration, such as less than 0.9, 0.8, 0.7, 0.6, 0.5, 0.4, 0.3, 0.2, or 0.1 g/L acetic acid concentration. The rectified liquid stream preferably has at least 10 g/L acetic acid concentration, such as about 15, 20, 25, 30, 35, 40, 45, 50 g/L or more acetic acid. In some embodiments, the rectified liquid stream has at least 3, 5, 10, or 15 times higher concentration of acetic acid compared to the stripped liquid stream.

In certain embodiments, the process further comprises recovering the acetic acid contained in the rectified liquid stream using liquid-vapor extraction, liquid-liquid extraction, or another separation process.

In some embodiments, the water-rich liquid stream includes evaporator condensate. The evaporator condensate may be derived from an evaporator in which biomass solids are concentrated, and the biomass solids may be derived from the same biomass feedstock as the biomass-derived liquid hydrolysate, in an integrated process.

Optionally, the fermentation inhibitor (e.g., acetic acid) is recycled to a previous unit operation for generating the biomass-derived liquid hydrolysate stream, to assist with hydrolysis or pretreatment of a biomass feedstock or component thereof.

The process may be continuous, semi-continuous, or batch. When continuous or semi-continuous, the stripping column may be operated countercurrently, cocurrently, or a combination thereof. The rectification column may be operated continuous, semi-continuous, or batch.

In various embodiments, step (g) comprises compressing and/or conveying the rectification column vapor stream using a device selected from the group consisting of a mechanical centrifugal vapor compressor, a mechanical axial vapor compressor, a thermocompressor, an ejector, a diffusion pump, a turbomolecular pump, and combinations thereof.

If desired, a base or other additive may be included in the water-rich liquid stream, or separately introduced to the rectification column, to produce salts or other reaction products derived from fermentation inhibitors. In some embodiments, the water-rich liquid stream includes one or more additives capable of reacting with the fermentation inhibitor. In certain embodiments, the fermentation inhibitor includes acetic acid, and the one or more additives include a base. An acetate salt may then be generated within the rectification column, or in a unit coupled to the rectification column. Optionally, the acetate salt may be separated and recovered using liquid-vapor extraction or liquid-liquid extraction.

In some embodiments, the process starts as biomass is received or reduced to approximately ¼" thickness. In a first step of the process, the biomass chips are fed to a pressurized extraction vessel operating continuously or in batch mode. The chips may be steamed or water-washed to remove dirt and entrained air. The chips are immersed with aqueous liquor or saturated vapor and heated to a temperature between about 100° C. to about 250° C., for example 150° C., 160° C., 170° C., 180° C., 190° C., 200° C., or 210° C. Preferably, the chips are heated to about 180° C. to 210° C. The pressure in the pressurized vessel may be adjusted to maintain the aqueous liquor as a liquid, a vapor, or a combination thereof. Exemplary pressures are about 1 atm to about 30 atm, such as about 3 atm, 5 atm, 10 atm, or 15 atm.

The aqueous liquor may contain acidifying compounds, such as (but not limited to) sulfuric acid, sulfurous acid, sulfur dioxide, acetic acid, formic acid, or oxalic acid, or combinations thereof. The dilute acid concentration can range from 0.01% to 10% as necessary to improve solubility of particular minerals, such as potassium, sodium, or silica. Preferably, the acid concentration is selected from about 0.01% to 4%, such as 0.1%, 0.5%, 1%, 1.5%, 2%, 2.5%, 3%, or 3.5%.

A second step may include depressurization of the extracted chips. The vapor can be used for heating the incoming woodchips or cooking liquor, directly or indirectly. The volatilized organic acids (e.g., acetic acid), which are generated or included in the cooking step, may be recycled back to the cooking.

A third step may include washing the extracted chips. The washing may be accomplished with water, recycled condensates, recycled permeate, or combination thereof. A liquid biomass extract is produced. A countercurrent configuration may be used to maximize the biomass extract concentration. Washing typically removes most of the dissolved material, including hemicelluloses and minerals. The final consistency of the washing may be increased to 30% or more, preferably to 50% or more, using a mechanical pressing device.

A fourth step may include drying of the extracted material to a desired final moisture. The heat necessary for drying may be derived from combusting part of the starting biomass. Alternatively, or additionally, the heat for drying may be provided by other means, such as a natural gas boiler or other auxiliary fossil fuel, or from a waste heat source. Optionally, drying of the extracted material may be accomplished by pyrolysis, torrefaction (mild pyrolysis), or gasification of the extracted material.

A fifth step may include preparing the biomass for combustion. This step may include grinding, milling, fluidizing, and/or pelletizing the extracted biomass. The biomass may be fed to a boiler in the form of fine powder, loose fiber, pellets, briquettes, or any other suitable form. In some embodiments, pellets of extracted biomass are preferred.

A sixth step is combustion of the biomass, which in some embodiments is in the form of biomass pellets. The biomass pellets are fed to boiler and combusted, preferably with excess air, using well-known combustion apparatus. Boiler bottom may be fixed, moving, or fluidized for the best efficiency. The flue gas is cooled and fly ash is collected into gravity collectors. In some embodiments, the extracted biomass is sufficiently low in ash such that when the extracted biomass is combusted, particulate matter emissions are very low. In certain embodiments, the particulate matter emissions are so low as to avoid the need for any additional cleaning device, and associated control system, in order to meet current emission regulations.

A seventh step may include treatment of the biomass extract to form a hydrolyzate comprising fermentable hemicellulose sugars. In some embodiments, the biomass extract is hydrolyzed using dilute acidic conditions at temperatures between about 100° C. and 190° C., for example about 120° C., 130° C., 140° C., 150° C., 160° C., or 170° C., and preferably from 120° C. to 150° C.

The acid may be selected from sulfuric acid, sulfurous acid, or sulfur dioxide. Alternatively, or additionally, the acid may include formic acid, acetic acid, or oxalic acid from the cooking liquor or recycled from previous hydrolysis. Alternatively, hemicellulase enzymes may be used instead of acid hydrolysis. The lignin from this step may be separated and recovered, or recycled to increase the heating value of the pellets, or sent directly to the boiler.

An eighth step may include evaporation of hydrolyzate to remove some or most of the volatile acids. The evaporation may include flashing or stripping to remove sulfur dioxide, if present, prior to removal of volatile acids. The evaporation step is preferably performed below the acetic acid dissociation pH of 4.8, and most preferably a pH selected from about 1 to about 2.5. The dissolved solids are concentrated, such as to about 10% to about 40% to optimize fermentable hemicellulose sugar concentration to a particular microorganism. *Saccharomyces Cerevisiae* fermentation can withstand dissolved solids concentrations of 30-50%, while *Clostridia Acetobutylicum* fermentation is viable at 10-20% concentrations only.

In some embodiments, additional evaporation steps may be employed. These additional evaporation steps may be conducted at different conditions (e.g., temperature, pressure, and pH) relative to the first evaporation step.

In some embodiments, some or all of the organic acids evaporated may be recycled, as vapor or condensate, to the first step (cooking step) and/or third step (washing step) to remove assist in the removal of minerals from the biomass. This recycle of organic acids, such as acetic acid, may be optimized along with process conditions that may vary depending on the amount recycled, to improve the cooking and/or washing effectiveness.

Optionally, the process may include co-combusting the recovered lignin with the low-ash biomass, to produce power. The recovered lignin may be combined with the low-ash biomass prior to combustion, or they may be co-fired as separate streams. When recovered lignin is combined with the low-ash biomass for making pellets, the lignin can act as a pellet binder.

In some embodiments, the fermentable hemicellulose sugars are recovered from solution, in solid form. In some embodiments, the fermentable hemicellulose sugars are fermented to produce of biochemicals or biofuels such as (but not limited to) ethanol, 1-butanol, isobutanol, acetic acid, lactic acid, or any other fermentation products. A purified fermentation product may be produced by distilling the fermentation product, which will also generate a distillation bottoms stream containing residual solids. A bottoms evaporation stage may be used, to produce residual solids.

Following fermentation, residual solids (such as distillation bottoms) may be recovered, or burned in solid or slurry form, or recycled to be combined into the biomass pellets. Use of the fermentation residual solids may require further removal of minerals.

Part or all of the residual solids may be co-combusted with the low-ash biomass, if desired. Alternatively, or additionally, the process may include recovering the residual solids as a fermentation co-product in solid, liquid, or slurry form. The fermentation co-product may be used as a fertilizer or fertilizer component, since it will typically be rich in potassium, nitrogen, and/or phosphorous.

In certain embodiments, the process further comprises combining, at a pH of about 4.8 to 10 or higher, a portion of the vaporized acetic acid with an alkali oxide, alkali hydroxide, alkali carbonate, and/or alkali bicarbonate, wherein the alkali is selected from the group consisting of potassium, sodium, magnesium, calcium, and combinations thereof, to convert the portion of the vaporized acetic acid to an alkaline acetate. The alkaline acetate may be recovered. If desired, purified acetic acid may be generated from the alkaline acetate.

The low-ash biomass has lower inorganic emissions potential compared to the original cellulosic biomass, in preferred embodiments. The reason is that the low-ash biomass will contain lower ash content compared to a process that does not extract inorganic components from the feedstock prior to combustion, in the manner disclosed herein.

Also, the low-ash biomass will generally have higher energy density compared to a process that does not extract hemicellulosic sugars from the feedstock prior to combustion. Depleting the biomass of hemicellulose sugars enriches the remaining material in lignin, which has a higher energy density than hemicellulose.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein. U.S. Pat. No. 8,685,685, issued on Apr. 1, 2014, is hereby incorporated by reference. U.S. patent application Ser. No. 13/026,273, filed Feb. 13, 2011, is hereby incorporated by reference.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A process for separating fermentation inhibitors from a biomass-derived hydrolysate, said process comprising:
    (a) providing a biomass-derived liquid hydrolysate stream comprising a fermentation inhibitor;
    (b) introducing said liquid hydrolysate stream to a stripping column;
    (c) introducing a steam-rich vapor stream to said stripping column to strip at least a portion of said fermentation inhibitor from said liquid hydrolysate stream;
    (d) recovering, from said stripping column, a stripped liquid stream and a stripper vapor output stream, wherein said stripped liquid stream has lower fermentation inhibitor concentration than said liquid hydrolysate stream;
    (e) compressing said stripper vapor output stream to generate a compressed vapor stream;
    (f) introducing said compressed vapor stream, and a water-rich liquid stream, to an evaporator;
    (g) recovering, from said evaporator, an evaporated liquid stream and an evaporator output vapor stream; and
    (h) recycling at least a portion of said evaporator output vapor stream to said stripping column as said steam-rich vapor stream, or a portion thereof.

2. The process of claim 1, wherein said fermentation inhibitor is selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof.

3. The process of claim 2, wherein said fermentation inhibitor is acetic acid and wherein said stripped liquid stream has less than 10 g/L acetic acid concentration.

4. The process of claim 3, wherein said stripped liquid stream has less than 5 g/L acetic acid concentration.

5. The process of claim 1, wherein said water-rich liquid stream contains biomass solids that are concentrated in said evaporator.

6. The process of claim 5, wherein said biomass solids are derived from the same biomass feedstock as said biomass-derived liquid hydrolysate.

7. The process of claim 1, wherein said fermentation inhibitor is recycled to a previous unit operation for generating said biomass-derived liquid hydrolysate stream, to assist with hydrolysis or pretreatment of a biomass feedstock or component thereof.

8. The process of claim 7, wherein said fermentation inhibitor includes acetic acid.

9. The process of claim 1, wherein said process is continuous or semi-continuous, and wherein said stripping column is operated countercurrently.

10. The process of claim 1, wherein said process is continuous or semi-continuous, and wherein said stripping column is operated cocurrently.

11. A process for separating fermentation inhibitors from a biomass-derived hydrolysate, said process comprising:
    (a) providing a biomass-derived liquid hydrolysate stream comprising a fermentation inhibitor;
    (b) introducing said liquid hydrolysate stream to a stripping column;
    (c) introducing a steam-rich vapor stream to said stripping column to strip at least a portion of said fermentation inhibitor from said liquid hydrolysate stream;
    (d) recovering, from said stripping column, a stripped liquid stream and a stripper vapor output stream, wherein said stripped liquid stream has lower fermentation inhibitor concentration than said liquid hydrolysate stream;
    (e) introducing said stripper vapor output stream, and a water-rich liquid stream, to an evaporator;
    (f) recovering, from said evaporator, an evaporated liquid stream and an evaporator output vapor stream;
    (g) compressing said evaporator output vapor stream to generate a compressed vapor stream; and
    (h) recycling at least a portion of said compressed vapor stream to said stripping column as said steam-rich vapor stream, or a portion thereof.

12. The process of claim 11, wherein said fermentation inhibitor is selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof.

13. The process of claim 12, wherein said fermentation inhibitor is acetic acid and wherein said stripped liquid stream has less than 10 g/L acetic acid concentration.

14. The process of claim 13, wherein said stripped liquid stream has less than 5 g/L acetic acid concentration.

15. The process of claim 11, wherein said water-rich liquid stream contains biomass solids that are concentrated in said evaporator.

16. The process of claim 15, wherein said biomass solids are derived from the same biomass feedstock as said biomass-derived liquid hydrolysate.

17. The process of claim 11, wherein said evaporator is a boiler, said water-rich liquid stream comprises boiler feed water, and said evaporated liquid stream comprises boiler condensate.

18. The process of claim 11, wherein said fermentation inhibitor is recycled to a previous unit operation for generating said biomass-derived liquid hydrolysate stream, to assist with hydrolysis or pretreatment of a biomass feedstock or component thereof.

19. The process of claim 18, wherein said fermentation inhibitor includes acetic acid.

20. The process of claim 11, wherein said process is continuous or semi-continuous, and wherein said stripping column is operated countercurrently or cocurrently.

21. A process for separating and recovering a fermentation inhibitor from a biomass-derived hydrolysate, said process comprising:
    (a) providing a biomass-derived liquid hydrolysate stream comprising a fermentation inhibitor;
    (b) introducing said liquid hydrolysate stream to a stripping column;
    (c) introducing a steam-rich vapor stream to said stripping column to strip at least a portion of said fermentation inhibitor from said liquid hydrolysate stream;
    (d) recovering, from said stripping column, a stripped liquid stream and a stripper vapor output stream, wherein said stripped liquid stream has lower fermentation inhibitor concentration than said liquid hydrolysate stream;
    (e) introducing said stripper vapor output stream, and a water-rich liquid stream, to a rectification column;
    (f) recovering, from said rectification column, a rectified liquid stream and a rectification column vapor stream, wherein said rectified liquid stream has higher fermentation inhibitor concentration than said liquid hydrolysate stream; and (g) recycling at least a portion of said rectification column vapor stream to said stripping column as said steam-rich vapor stream, or a portion thereof.

22. The process of claim 21, wherein said fermentation inhibitor is selected from the group consisting of acetic acid, formic acid, formaldehyde, acetaldehyde, lactic acid, furfural, 5-hydroxymethylfurfural, furans, uronic acids, phenolic compounds, sulfur-containing compounds, and combinations or derivatives thereof.

23. The process of claim 22, wherein said fermentation inhibitor is acetic acid.

24. The process of claim 23, wherein said stripped liquid stream has less than 10 g/L acetic acid concentration.

25. The process of claim 24, wherein said stripped liquid stream has less than 5 g/L acetic acid concentration.

26. The process of claim 23, wherein said rectification column vapor stream has less than 0.5 g/L acetic acid concentration.

27. The process of claim 26, wherein said rectification column vapor stream has less than 0.1 g/L acetic acid concentration.

28. The process of claim 23, wherein said rectified liquid stream has at least 25 g/L acetic acid concentration.

29. The process of claim 23, wherein said rectified liquid stream has at least 10 times higher concentration of acetic acid compared to said stripped liquid stream.

30. The process of claim 23, said process further comprising recovering said acetic acid contained in said rectified liquid stream using liquid-vapor extraction or liquid-liquid extraction.

31. The process of claim 21, wherein said water-rich liquid stream includes evaporator condensate.

32. The process of claim 31, wherein said evaporator condensate is derived from an evaporator in which biomass solids are concentrated.

33. The process of claim 32, wherein said biomass solids are derived from the same biomass feedstock as said biomass-derived liquid hydrolysate.

34. The process of claim 21, wherein said fermentation inhibitor is recycled to a previous unit operation for generating said biomass-derived liquid hydrolysate stream, to assist with hydrolysis or pretreatment of a biomass feedstock or component thereof.

35. The process of claim 34, wherein said fermentation inhibitor includes acetic acid.

36. The process of claim 21, wherein said process is continuous or semi-continuous, and wherein said stripping column is operated countercurrently or cocurrently.

37. The process of claim 21, wherein step (g) comprises compressing and/or conveying said rectification column vapor stream using a device selected from the group consisting of a mechanical centrifugal vapor compressor, a mechanical axial vapor compressor, a thermocompressor, an ejector, a diffusion pump, a turbomolecular pump, and combinations thereof.

38. The process of claim 21, wherein said water-rich liquid stream includes one or more additives capable of reacting with said fermentation inhibitor.

39. The process of claim 38, wherein said fermentation inhibitor includes acetic acid, and wherein said one or more additives include a base; said process further comprising generating an acetate salt in said rectification column.

40. The process of claim 39, said process further comprising recovering said acetate salt contained in said rectified liquid stream using liquid-vapor extraction or liquid-liquid extraction.

* * * * *